April 7, 1953          C. A. LANGSTAFF          2,633,750
MEANS FOR MEASURING LIQUID BY WEIGHT
Filed Nov. 5, 1947          3 Sheets-Sheet 1
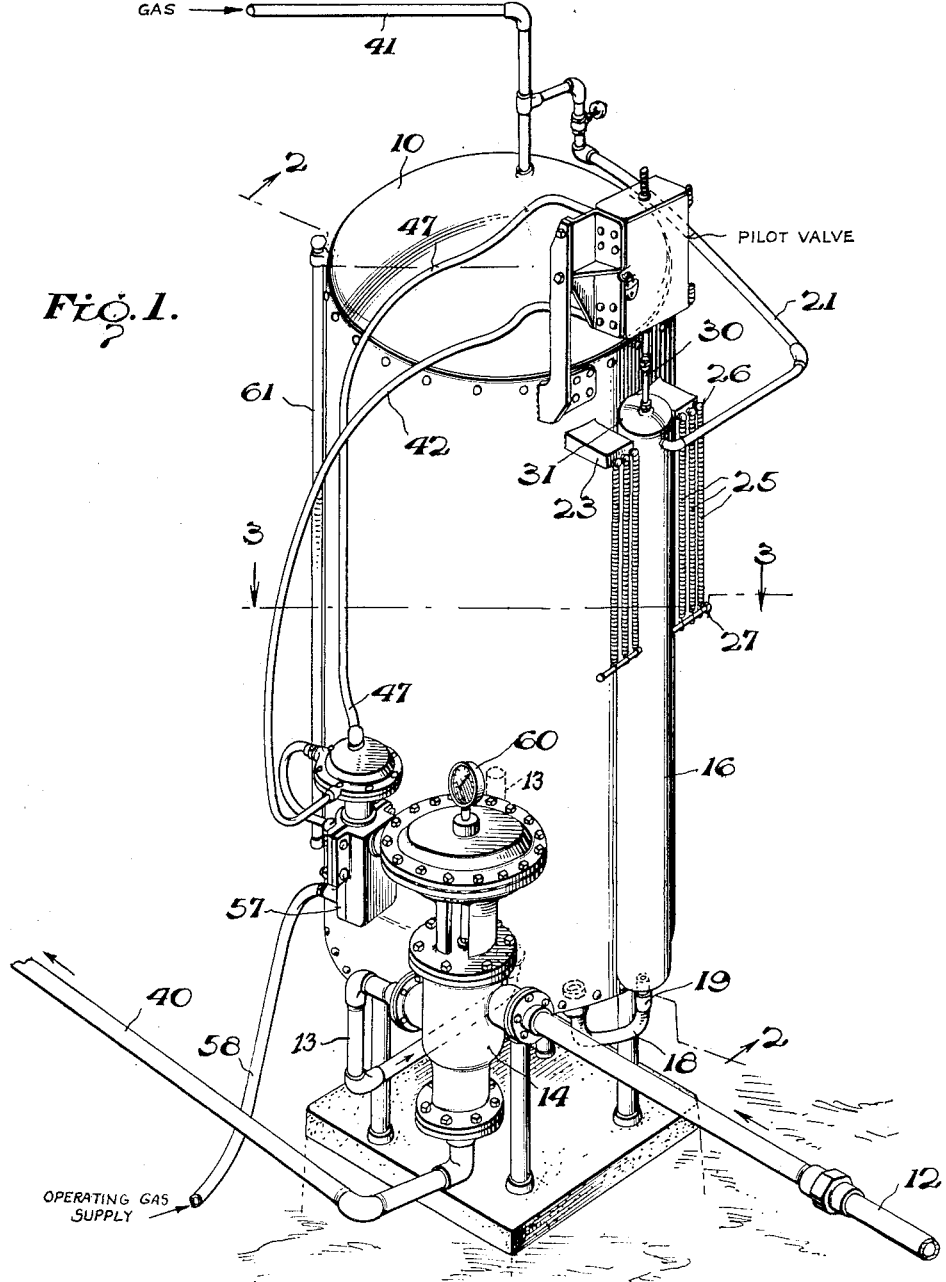
INVENTOR
C. A. Langstaff.
BY
Wilfred E. Lawson
ATTORNEY

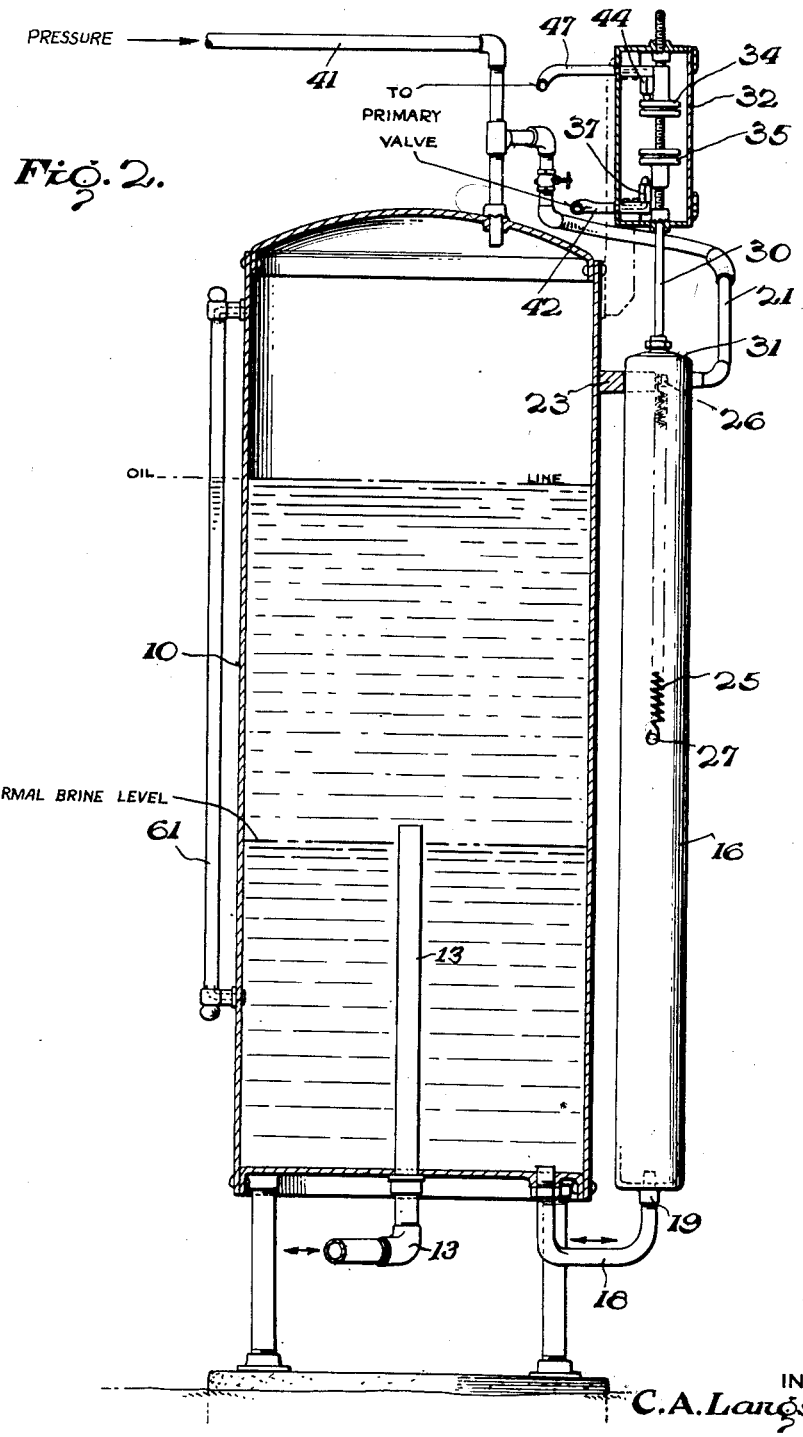

April 7, 1953          C. A. LANGSTAFF          2,633,750
MEANS FOR MEASURING LIQUID BY WEIGHT
Filed Nov. 5, 1947          3 Sheets-Sheet 3
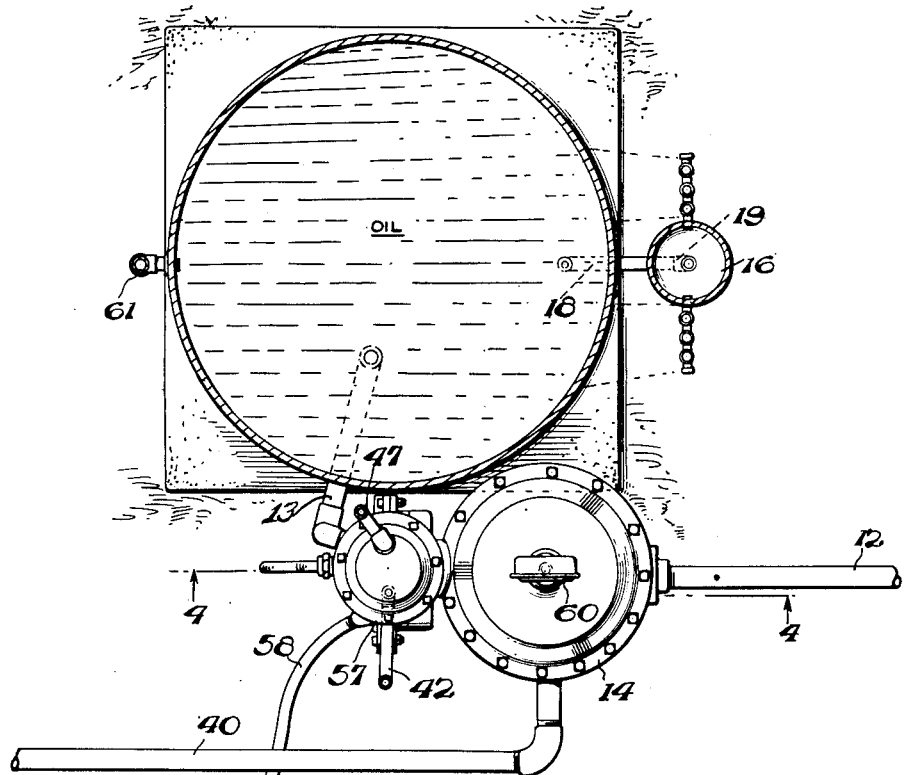
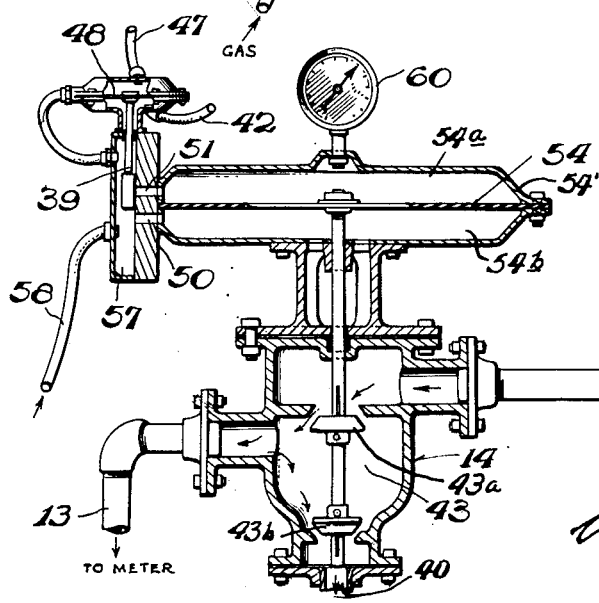
INVENTOR
C. A. Langstaff.
BY Wilfred Lawson
ATTORNEY Patented Apr. 7, 1953

2,633,750

UNITED STATES PATENT OFFICE 2,633,750

MEANS FOR MEASURING LIQUID BY WEIGHT

Clinton A. Langstaff, Compton, Calif.

Application November 5, 1947, Serial No. 784,197

4 Claims. (Cl. 73—223)

The present invention relates to means for accurately measuring the quantity of a liquid by the weight or specific gravity thereof and more particularly to a novel arrangement for the measurement of the quantity of crude oil solely by means of the specific gravity of the oil.

Usually, meters for measuring the quantity of a liquid, such as crude oil measure the same by volume. Due to the fact that crude oil is saturated with gas, accurate measurement of the quantity by volume is extremely difficult and in many instances practically impossible without means to compensate for the gas present.

Accordingly, it is an object of the present invention to provide novel means for automatically measuring quantities of crude oil or the like independently of any entrained gases.

Another object is to provide a liquid measuring meter adapted to be actuated by weight or specific gravity of the liquid to be measured.

A further object is to provide novel valve mechanism adapted to cooperatively be actuated by an element of the meter, to regulate the flow of fluid being measured to and from the meter reservoir by means of the specific gravity of the liquid to be measured.

With these and other objects in view, the invention consists in the construction, arrangement and combination of parts hereinafter described and particularly pointed out in the claims, it being understood that I do not intend to limit myself to the details of construction.

In the drawings, like parts throughout the several views are given like numerals and are thus identified in the following detailed description:

Fig. 1 is an upright perspective view of the meter mounted adjacent a main tank or receiving reservoir;

Fig. 2 is a vertical cross section view of the arrangement illustrated in Fig. 1;

Fig. 3 is a horizontal cross-section view taken along the line 3—3 of Fig. 1;

Fig. 4 is a vertical cross-section view of a three-way valve, on the line 4—4 of Fig. 3, showing the several connections from the oil source, to the tank and to the meter device.

Referring in detail to the drawings, and first with particular reference to Fig. 1, there is illustrated a main tank or receiving reservoir 10, connected to a source of supply by an inlet pipe 12, coupled to a three-way valve housing 14. Mounted adjacent an exterior side of the main tank 10 is an auxiliary tank 16.

The main reservoir 10 is connected from its bottom portion by a flexible tube 18, coupled over a nipple 19, opening into the bottom of the auxiliary tank 16. Also leading from the main tank to the auxiliary tank is a pressure equalizing flexible tube 21. The tank 16 is suspended between the arms of a U-shaped bracket 23, by a plurality of resilient members, such as coiled springs 25 secured between studs 26 on the bracket and arms 27, formed in the side of the tank 16. The main reservoir 10 contains a constant supply of brine solution or water at a predetermined level and is in constant communication with the auxiliary tank 16 by flexible hose 18 leading out of the tank below the brine line. This brine solution is adapted to be displaced by the weight of the crude oil, which enters the tank by conduit 13 extending up into the tank just above the brine level. Thus, as oil flows into the main tank 10, through conduit 13 above the brine level the weight of the oil unbalances the brine column and causes a portion of the brine upwardly of the sight tube 61 to establish the desired level of the crude oil and the remainder to pass to tank 16. As the weight of the oil increases the greater is the amount of the brine solution which flows into the tank 16 with a resultant increase in the weight of the tank 16. This will lower the tank 16 and stretch the springs 25.

A rigid connection 30, carried vertically by the dome 31 of the auxiliary tank 16, extends upwardly through aligned openings in a pilot valve box 32. This connection 30 within the box 32 is threaded and adjustably mounted on the threaded section are pilot valve actuators 34 and 35, see Fig. 2. Thus, as the weight of the auxiliary vessel or tank 16 increases by the displacement of the brine solution, the lower actuator 35 closes a nozzle 37 within the lower end of the box 32 and connected to line 42, to operate a diaphragm controlled primary valve 39, coupled thereto by a hose 42. This valve 39 in turn actuates a main three-way valve 43 in housing 14, so that intake line 12, from the supply source, is closed at the valve element 43a and storage line 40 is opened at the valve element 43b to permit discharge of oil from the main tank 10 out through the inlet 13 to the lower part of the valve housing 14 to storage tanks or the like, not shown. Pressure is supplied by a hose 41 into the top of main tank 10 to boost the discharge of oil from the tank by way of the inlet-outlet conduit 13 which connects with the line 40. The source of gas pressure may be a known gas oil separator arranged to separate gas from the oil to be measured. Ordinarily there is a back-pressure on these separators of about 35 or 40 pounds per square inch and by connecting the hose 41 to the top of the reservoir 10 from the gas compartment of the separator a pressure head is developed, which serves to force oil out of the inlet-out conduit 13 via the valve 43 when the port to line 40 is opened, as hereinafter explained.

As the oil discharges the weight of the auxiliary tank 16 decreases and the springs 25 return the same to its normal position when the brine returns to the tank 10 via the flexible tube 18. When this is done a second nozzle 44, within the upper end of the box 32 and connected with line 47, is closed by the actuator 34, causing the three-way valve 43 to close off the port to discharge line 40 and again open the port to the intake line 12. This operation is controlled by the line 47 from the upper nozzle 44, which line goes to the opposite side of the diaphragm 48 of a primary valve 39, see Fig. 3. Thus, nozzles 37 and 44, and valve 39, coact to control the actuation of the main valve 43 by alternate opening and closing of ports 50 and 51 leading to opposite sides of the main valve diaphragm 54, housed within a chamber 54' and dividing it into an upper compartment 54a and a lower compartment 54b; the port 51 opening into the compartment 54a and the port 50 into the compartment 54b.

The chamber 54' communicates through openings 50 and 51 with a chamber 57 charged with gas by line 58. Accordingly when either of the ports is opened by the primary valve 39, gas will feed to one side or the other of the diaphragm and actuate the main valve 43. Each discharge of the main and auxiliary tanks is recorded by means of a suitable pressure responsive counter 60 which is actuated by pressure created by movement of the diaphragm 54 when gas from the chamber 57 enters the lower compartment 54b to cause the closing of the valve element 43a and the opening of the valve element 43b.

The volume of discharge from the main tank 10 of the heavy liquid into the auxiliary tank 16 is computed from the high and low points of fluid as observed in a sight glass 61.

*Operation*

The general sequence of operation is as follows:

Oil is supplied to the main tank 10 and as the weight of the oil increases the brine solution is displaced in greater volume from tank 10 into the auxiliary vessel 16. The latter, with pilot valve stem attached, is drawn down until lower actuator 35 in pilot valve box 32 closes on the lower nozzle 37 and the upper actuator acts to open the upper nozzle 44 to thereby affect the release of the pressure from the top of the primary valve diaphragm 48 through copper tubing 47. This diaphragm, being already pressured up on both sides through small orifices from operating gas sources, thrusts upward as pressure is relieved on the top side. This movement pulls the sliding valve 39 of the primary upward so that gas is admitted in volume to the lower side of the large three-way valve diaphragm 54. Thus, the lower or outlet valve from the meter is opened and the same upward movement closes temporarily the intake of oil from the source. As oil is discharged from the tank 10, the reverse of the above takes place. Weigh springs 25 pull the pilot valve stem back until the actuator 34 closes on the upper nozzle for the operation of the three-way valve in the other direction.

The amount of oil discharged from the meter with each valve operation is determined by the brine passing to the auxiliary tank 16 when its weight is sufficient to cause the downward movement of the tank to lower the actuator element 35 into operative relation with respect to the pilot nozzle 37; the level of the brine in the tank 10 at such time being substantially that of the same within the sight tube 61. This level will also be that of the crude oil in the tank 10 at the time of its discharge, provided that it is free of any entrained gas, otherwise its level will be somewhat higher.

Although only one embodiment of the invention has been illustrated and described in detail, it is to be expressly understood that the invention is not limited thereto. For example, various changes may be made in the design and arrangement without departing from the spirit and scope of the invention, as will now likely occur to others skilled in the art. For a definition of the limits of the invention, reference should be had to the appended claims.

What I claim is:

1. Means for measuring a quantity of a relatively light liquid by its specific gravity, comprising a main tank containing a predetermined quantity of a relatively heavy liquid and connected by a supply pipe to a source of the light liquid, a supply line for introducing a fluid pressure to said main tank above the level of the light liquid admitted to the main tank, an auxiliary tank, resilient means supporting said auxiliary tank for vertical movements alongside of and relatively to said main tank, a flexible tube connecting the bottoms of said tanks to reversely transfer the heavy liquid from one tank to the other, a second flexible tube connecting said supply line with the upper end of said auxiliary tank to balance the pressure in both tanks, cooperative valve means in said supply pipe for controlling the supply and discharge of the light liquid to and from said main tank, said valve means being controlled by movements of said auxiliary tank due to the flow and ebb of the heavy liquid between the latter and the main tank, and other means controlled by said valve means for counting each discharge of the light liquid from said main tank.

2. The invention as defined in claim 1, with the said main tank having a bottom inlet connected with said supply pipe from the source of the light liquid extending upwardly therein to a point slightly above the level of the heavy liquid, said inlet also constituting the outlet for the discharge of the light liquid from said main tank.

3. The invention as defined in claim 1, with a sight tube mounted on the side of said main tank and having its lower end in open communication therewith below the level of the heavy liquid for indicating the level of that liquid in the main tank following the passage of a portion of the same into said auxiliary tank, said heavy liquid only rising within said sight tube following the return of the said portion thereof from the auxiliary tank into said main tank.

4. The invention as defined in claim 1, with a bracket mounted on the side of said main tank and said resilient means being constituted in coil springs depending from said bracket at opposite sides of said auxiliary tank for supporting the latter therefrom.

CLINTON A. LANGSTAFF.

REFERENCES CITED

The following references are of record in the file of this patent:

UNITED STATES PATENTS

| Number | Name | Date |
|---|---|---|
| 1,575,816 | Carlstedt | Mar. 9, 1926 |
| 2,197,204 | Cooper | Apr. 16, 1940 |
| 2,325,695 | McAfee | Aug. 3, 1943 |
| 2,392,951 | Salisbury | Jan. 15, 1946 |